United States Patent [19] [11] 4,179,527
White, deceased [45] Dec. 18, 1979

[54] PROCESS FOR MANUFACTURING A WHOLE WHEAT FOOD PRODUCT

[75] Inventor: E. Gurney White, deceased, late of McAllen, Tex., by Robert G. Williams, executor

[73] Assignee: Nabisco, Inc., East Hanover, N.J.

[21] Appl. No.: 902,448

[22] Filed: May 3, 1978

[51] Int. Cl.$^2$ .............................................. A23L 1/164
[52] U.S. Cl. .................................. 426/620; 426/444; 426/466; 426/508
[58] Field of Search ............... 426/618, 620, 619, 627, 426/462, 464, 466, 508, 524, 509, 455, 457, 444

[56] References Cited

U.S. PATENT DOCUMENTS

| | | | |
|---|---|---|---|
| 2,021,772 | 11/1935 | Fleisher | 34/15 |
| 2,072,737 | 3/1937 | Duval | 34/15 |
| 2,114,595 | 4/1938 | Fennema | 34/15 |
| 2,801,176 | 7/1957 | Ozai-Durrani | 426/620 |
| 3,505,078 | 4/1970 | Hreschak | 426/619 |
| 4,115,596 | 9/1978 | Knutrud | 426/497 |

FOREIGN PATENT DOCUMENTS

| | | |
|---|---|---|
| 459829 | 1/1937 | United Kingdom . |
| 476248 | 12/1937 | United Kingdom . |
| 479715 | 2/1938 | United Kingdom . |
| 1413481 | 11/1975 | United Kingdom . |
| 1413482 | 11/1975 | United Kingdom . |

Primary Examiner—Raymond N. Jones
Assistant Examiner—Elizabeth A. Hatcher
Attorney, Agent, or Firm—Scully, Scott, Murphy & Presser

[57] ABSTRACT

A process for manufacturing a whole wheat food product is disclosed which comprises:
(a) cooking a mixture of water and whole wheat to provide a cooked whole wheat containing from about 28% to about 55% moisture by weight;
(b) holding the cooked whole wheat for a period of from 0 to about 12 hours under ambient temperature and pressure conditions;
(c) chilling the cooked whole wheat to a temperature selected from within the range of from about 1° C. to about 12° C. (about 34° F. to about 54° F.) to temper the wheat, the temperature selected being such that as the duration of the holding period of step (b) is increased from 0 to about 12 hours, the chilling temperature is proportionately increased from about 1° C. to about 12° C.;
(d) shaping the chilled tempered whole wheat to a desired configuration; and
(e) baking or toasting the shaped, tempered whole wheat to provide a whole wheat food product.

12 Claims, No Drawings

PROCESS FOR MANUFACTURING A WHOLE WHEAT FOOD PRODUCT

BACKGROUND OF THE INVENTION

1. Field of the Invention

This invention relates to the field of processes for manufacturing a whole wheat food product such as a breakfast cereal, and in particular, to such processes in which a cooked whole wheat must undergo tempering prior to shaping and baking.

2. Description of the Prior Art

Starch is the major component of whole wheat, present in most types of wheats at levels in excess of 50% by weight. Since it is the major constituent, changes in its chemical and physical properties will greatly affect the properties of the whole wheat berry. Wheat starch is composed of two polysaccharides which are polymers of D-glucose. One, amylose, is a linear polymer and the other, amylopectin, is a branched, bushlike polymer. These two polysaccharides in an approximate proportion of 1:3, amylose:amylopectin, occur naturally in wheat endosperm in the form of large lenticular granules. Where the adjacent linear molecules or the outer branches of the branched molecules are packed in a parallel arrangement, they are believed to be held together by hydrogen bonds forming crystalline regions. Between crystalline regions are loosely packed amorphous material, easily accessible to water. Gelatinization is the term most frequently applied to the sequence of changes which occur when starch is heated in water, i.e., cooked. The onset of gelatinization occurs with the sudden swelling of the starch granules at about 60° C. As the temperature increases, the granules continue to take up water and expand considerably although still retaining their entity because of residual bonding in the crystalline regions. However, many of the bonds in the crystalline regions are broken. When the heated, gelatinized starch granules are allowed to cool, intermolecular bonds form both within and between swollen starch granules and their fragments. This return to a crystalline structure, which is not that of the original starch granules has been termed retrogradation. In the manufacture of a whole wheat food product such as shredded wheat, whole wheat is cooked sufficiently to gelatinize the starch. If shredding is attempted shortly after cooking, i.e., before the gelatinized wheat has cooled to provide a sufficient degree of retrogradation, or tempering, one obtains at best short non-continuous strands and/or strands which are tough, curly or suffer from some other physical or textural disadvantage. This result is primarily due to the amorphous sponge-like nature of freshly gelatinized starch. However, if the freshly cooked whole wheat is permitted to cool for a certain period, retrogradation will occur with a consequent increase in the rigidity of the starch polysaccharides. With sufficient retrogradation of the starch, shredding or other similar shaping operation will provide good shreds.

In known and conventional processes for manufacturing a whole wheat food product, tempering of the cooked whole wheat is commonly carried out by holding the wheat at ambient pressure and temperature, e.g., from about 15° to 30° C., for a period of from 8 to 28 hours. As a result of the tempering, the grain attains a uniform temperature and moisture content and the starch content thereof is sufficiently retrograded to permit effective shaping of the cooked wheat. Such relatively lengthy tempering periods require substantial storage facilities and result in a more time-consuming, complex and labor-intensive manufacturing cycle.

While it is recognized that the rate of ageing of concentrated wheat starch gels is increased at reduced temperature (McIver et al., "Kinetic Study of the Retrogradation of Gelatinised Starch", *J. Sci. Fd. Agric.*, October, 1968, Vol. 19, pp. 560–563; K. H. Colwell et al., "Effect of Storage Temperature on the Ageing of Concentrated Wheat Starch Gels", *J. Sci. Fd. Agric.*, September, 1969, Vol. 20, pp. 550–555), heretofore there has been no recognition or appreciation that the tempering of cooked wheat is accelerated within a certain range of chilling temperature.

U.S. Pat. No. 1,372,842 to Sutherland describes cooling flour to 0° C. or below, preferably after a heating step in which the flour is quickly heated up to 75° C., thereby increasing the yield of bread prepared from such flour. U.S. Pat. No. 1,670,016 to Bartmann calls for alternate heating and cooling of wheat from 100° C. to 0° C. in a very short time for the purpose of paralyzing or killing the germ. Neither of these patents is concerned with the tempering of cooked wheat to be used in the manufacture of breakfast cereal.

SUMMARY OF THE INVENTION

It has surprisingly been discovered that the time required for the tempering of cooked whole wheat can be substantially reduced by chilling the wheat at a temperature of from about 1° C. to about 12° C. (from about 34° F. to about 54° F.)

Broadly stated, the process for manufacturing a whole wheat food product according to this invention comprises:

(a) cooking a mixture of water and whole wheat to provide a cooked whole wheat containing from about 28% to about 55% moisture by weight;

(b) holding the cooked whole wheat for a period of from 0 to about 12 hours under ambient temperature and pressure conditions;

(c) chilling the cooked whole wheat to a temperature selected from within the range of from about 1° C. to about 12° C. (about 34° F. to about 54° F.) to temper the wheat, the temperature selected being such that as the duration of the holding period of step b) is increased from 0 to about 12 hours, the chilling temperature is proportionately increased from about 1° C. to about 12° C.;

(d) shaping the chilled tempered whole wheat to a desired configuration; and (e) baking or toasting the shaped, tempered whole wheat to provide a whole wheat food product.

The dramatic reduction of the time for tempering cooked whole wheat in accordance with the whole wheat food manufacturing process of this invention compared with that required for known and conventional processes permits a corresponding reduction of storage capacity and associated equipment and results in a simpler, more manageable and more efficient manufacturing sequence. Moreover, since tempering herein is conducted under controlled temperature conditions, daily and seasonal variations in ambient temperature which must be taken into account in the known and conventional tempering procedures can be altogether ignored.

Thus, it is possible using the process herein to manufacture a whole wheat food product, for example, a biscuit-shaped shredded wheat cereal, in substantially less time and at considerably greater economy than possible with known and conventional methods of manufacturing such a product.

DESCRIPTION OF THE PREFERRED EMBODIMENTS

The cooked whole wheat herein can be prepared from a single variety or blend of whole wheat. The amount of water added to the whole wheat in the cooking operation can vary within wide limits but in any event, must be sufficient to provide a cooked whole wheat containing from about 28% to about 55%, and preferably, from about 42% to about 46%, moisture by weight following any subsequent partial drying procedure which can be optional. In one cooking operation, a cooked whole wheat containing about 50% moisture by weight is passed through a cooling tower resulting in a surface-dried wheat having a reduced moisture content of about 45% by weight. Advantageously, the cooked whole wheat is held for about 0 to 4 hours prior to chilling, and preferably 1 to 2 hours, to permit moisture to penetrate the testa layer into the endosperm, or center, of the individual wheat kernels. The wheat can also be cooked with one or more other food ingredients at the usual levels of concentration. Thus, for example, the wheat can be cooked with a sugar such as sucrose, salt, malt, flavoring, food colorant, emulsifier, vitamin and/or mineral.

Chilling of the cooked whole wheat can be accomplished by the use of chilled air or refrigeration liquids and gases such as nitrogen or $CO_2$, by vacuum cooling or any other well known means for obtaining reduced temperatures. Thus, for example, the wheat can be continuously or intermittently conveyed through a tunnel or similar enclosed zone in a direction with, or counter to, the flow of a low temperature inert gas such as nitrogen or carbon dioxide. As will be readily understood by those skilled in the art, the residence time of the wheat in the tunnel, and the velocity, temperature and volume of the low temperature inert gas passing through the tunnel are the principal factors which will determine the extent to which the cooked whole wheat is chilled. Optimum cooling for a given manufacturing operation can therefore be readily obtained by suitable adjustment of one or more of the aforesaid factors. As is readily apparent to those skilled in the art, the uniformity with which the cooked whole wheat mass will attain the desired final chilling temperature will depend to an extent upon the bulk of the mass and the configuration of the vessel holding the wheat. Accordingly, it is preferred to arrange the bulk and shape of the cooked whole wheat mass in a manner which will provide a reasonably uniform final chilling temperature throughout the mass. In one cooling procedure which has provided good results, a liquid $CO_2$ chilling apparatus was used which was a revolving enclosed scalper having a perforated stainless steel drum approximately 18 inches in diameter and 8 feet long and equipped with L-shaped lifters mounted the full interior length thereof. A fan was provided at the feed end of the apparatus and a smaller extraction fan was provided at the discharge end to remove excess $CO_2$ vapor. Cooked whole wheat from a cooling tower was introduced into the drum via a screw feeder and the chilled, tempered wheat was discharged at the opposite end of the drum over a 2 inch weir. The weir maintained a 2 to 3 inch level of wheat in the drum. Average retention time in the drum was about 40 seconds. Liquid $CO_2$ was introduced into the drum at a flow rate of about 10 pounds per minute through a nozzle of 0.100 inches diameter. Such apparatus can also effectively utilize liquid nitrogen as the cooling medium. Another effective cooling procedure is simply to place a quantity of cooked whole wheat in a refrigeration zone or room with chilled air as the cooling medium until the desired temperature of the wheat is attained.

Yet another cooling procedure is to subject the cooked whole wheat to a vacuum in the range of from about 2 to 16 torr for a holding period sufficient to bring the wheat to within the desired range of chilling temperature. The temperature range for the chilling step herein, i.e., from about 1° C. to about 12° C. is critical. At 0° C. and below, ice crystal formation results in undesirable changes in the nature of the cooked wheat, and above about 12° C., inadequate tempering is achieved. A relationship exists between the duration of the period the cooked wheat is held prior to chilling and the chilling temperature such that, as the duration of the holding period increases from 0 to about 12 hours, the chilling temperature must be proportionately increased from about 1° C. to the maximum of about 12° C. to effect proper tempering. Thus, for example, it has been found that if the cooked wheat is chilled immediately upon completion of cooking, or upon completion of cooking and optional cooling, a temperature of about 1° to 2° C. will be necessary for adequate tempering. Conversely, if the cooked wheat is held for about 3 to 4 hours before chilling, a chilling temperature of about 9° to 12° C. will be required to provide an acceptable degree of tempering. In the case of a cooked whole wheat which is held for the preferred period of from about 1 to 2 hours, the optimum chilling temperature is from about 3° C. to about 5° C.

Following completion of the tempering operation, the chilled wheat is conveyed to known and conventional shaping apparatus such as a shredder, extruder, flaker, and the like, where it is formed into pieces having the configuration of the finished cereal product. The shaped pieces are then subjected to thermal processing, i.e. they are conveyed to an oven for baking or toasting, the operational parameters of which are well known in the art.

The following examples are illustrative of the process of this invention when applied to the step of shredding whole cooked wheat in the manufacturing of a biscuit-shaped shredded wheat breakfast cereal:

EXAMPLE 1

2724 gm. whole wheat mixed with 6750 gm. water was cooked at 100° C. for about ½ hour. Thereafter the cooked whole wheat was air-dried to a moisture content of about 45 to 50% by weight. The freshly cooked air-dried wheat was then divided into two equal parts, one of which was retained as a control and the other of which was divided into four equal portions, A, B, C and D. Cooked whole wheat portions A, B, C and D were placed in a refrigeration zone maintained at a temperature of 2° to 7° C. approximately 40 minutes from the time they had been cooked. These portions of the control cooked whole wheat were then shredded following one, two, three and four hours of refrigeration respectively. Similarly, portions of the unrefrigerated control were also shredded at intervals of one, two, three and four hours to provide a comparison with the refrigerated portions.

| Chilled Portion | Holding Period | Characteristics of Shredded Wheat (Chilled Portions and Controls) |
|---|---|---|
| A | 1 hour | Chilled wheat shreds A were curly, tough and pulled well out. The control wheat shreds were curly and tougher than A and pulled out to an even greater extent than the latter. The control did not shred as well as A though neither shredded well. |
| B | 2 hours | Chilled wheat shreds B were curly and tough. They pulled out but not as much as A. The control shreds were more curly and tougher than B and pulled out to a greater extent. B shredded better than the control and better than A. |
| C | 3 hours | Chilled wheat shreds C were only slightly curled. They were considerably more tender than the control shreds. Shreds C fell down more nearly straight than B. Control shreds were more curly and tougher than C and pulled out considerably more. |
| D | 4 hours | Chilled wheat shreds D shredded well; the shreds were tender and straight and fell from the shredding roll in a clean drop. The shreds were entirely suitable for baking into an acceptable biscuit-shaped shredded wheat cereal. The control shreds shredded fairly well but were tough and curly and pulled out much more than D. |

The foregoing example demonstrates that chilled cooked whole wheat held for progressively longer periods under chilling conditions up to an optimum of four hours in each case provided a shredded wheat of superior appearance and or texture compared to a cooked whole wheat which had not been chilled.

EXAMPLE 2

2724 gm whole wheat mixed with 6750 gm water was cooked at 100° C. for 35 minutes and the cooked wheat was drained and surface-dried with a current of air directed over the wheat with a fan. The wheat was divided into two equal parts, one to serve as control and the other to be subdivided into four portions E, F, G and H. The portions E, F, G and H were placed in a refrigeration zone at 2° to 7° C. for periods ranging from 1 to 4 hours as in Example 1. The chilled portions and the controls were shredded and the same results observed in the shredding of portions A, B, C and D and the control of Example 1 were again observed. Portion H which had been chilled at 2° to 7° C. for 4 hours was entirely suitable for shredding and compared favorably with a cooked whole wheat which had been conventionally tempered for 24 hours under ambient pressure and temperature conditions.

What is claimed is:

1. A process for manufacturing a whole wheat food product which comprises:
    (a) cooking a mixture of water and whole wheat to provide a cooked whole wheat containing from about 28% to about 55% moisture by weight;
    (b) holding the cooked whole wheat for a period of from 0 to about 12 hours under ambient temperature and pressure conditions;
    (c) chilling the cooked whole wheat to a temperature of from about 1° C. to about 12° C. to temper the wheat, the temperature selected being such that as the duration of the holding period of step (b) is increased from 0 to about 12 hours, the chilling temperature is proportionately increased from about 1° C. to about 12° C.;
    (d) shaping the chilled tempered whole wheat to a desired configuration; and
    (e) baking or toasting the shaped, tempered whole wheat food product.

2. The process of claim 1 wherein following cooking step (a), the cooked wheat is subjected to surface drying.

3. The process of claim 2 wherein the moisture content of the cooked wheat prior to surface drying is from above about 48% to about 55% by weight and the moisture content of the cooked wheat following surface drying is from about 42% to about 48% by weight.

4. The process of claim 3 wherein the cooked whole wheat is held for a period of from 1 to 2 hours prior to chilling, and the chilling temperature is from about 3° C. to about 5° C.

5. The process of claim 1 wherein the chilling is carried out by introducing the cooked whole wheat into an enclosed zone counter to the flow of a low temperature inert gas selected from the group consisting of nitrogen and carbon dioxide.

6. The process of claim 1 wherein chilling is carried out by introducing the cooked whole wheat into a refrigeration zone in which chilled air is the cooling medium.

7. The process of claim 1 wherein chilling is carried out by vacuum cooling the cooked whole wheat.

8. The process of claim 1 wherein the mixture of water and wheat of cooking step (a) also contains at least one additional food ingredient selected from the groupconsisting of a sugar, salt, malt, flavoring, food colorant, emulsifier, vitamin and mineral.

9. A process for manufacturing a biscuit-shaped, shredded wheat food product which comprises:
    (a) cooking a mixture of water and whole wheat to provide a cooked whole wheat containing from about 44 to about 50% water by weight;
    (b) drying the surface of the individual grains of the cooked whole wheat to provide a surface-dried whole wheat having a water content of from about 42 to about 48% by weight;
    (c) holding the surface-dried cooked whole wheat for a period of from about 1 to 2 hours under ambient temperature and pressure conditions;
    (d) chilling the cooked wheat at a temperature of from about 3° C. to about 5° C. to temper the wheat.
    (e) shredding the chilled, cooked whole wheat to provide biscuits of same; and
    (f) baking the biscuits.

10. The process of claim 9 wherein the chilling is carried out by introducing the cooked whole wheat into an enclosed zone counter to the flow of a low temperature inert gas selected from the group consisting of nitrogen and carbon dioxide.

11. The process of claim 9 wherein chilling is carried out by introducing the cooked whole wheat into a refrigeration zone in which chilled air is the cooling medium.

12. The process of claim 9 wherein chilling is carried out by vacuum cooling the cooked whole wheat.

* * * * *